(12) United States Patent
Kwon et al.

(10) Patent No.: US 9,366,917 B2
(45) Date of Patent: Jun. 14, 2016

(54) LIQUID CRYSTAL DISPLAY

(71) Applicant: Samsung Display Co., Ltd., Yongin, Gyeonggi-Do (KR)

(72) Inventors: Oh Jeong Kwon, Hwaseong-si (KR); Hyeok Jin Lee, Seongnam-si (KR); Jae Hong Park, Seoul (KR); Heung Shik Park, Seoul (KR); Ki Chul Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 85 days.

(21) Appl. No.: 14/149,958

(22) Filed: Jan. 8, 2014

(65) Prior Publication Data

US 2015/0055049 A1 Feb. 26, 2015

(30) Foreign Application Priority Data

Aug. 26, 2013 (KR) .................. 10-2013-0101136

(51) Int. Cl.
*G02F 1/1337* (2006.01)
*G02F 1/1343* (2006.01)

(52) U.S. Cl.
CPC .... *G02F 1/134309* (2013.01); *G02F 1/133707* (2013.01); *G02F 2001/134318* (2013.01); *G02F 2001/134345* (2013.01)

(58) Field of Classification Search
CPC .......... G02F 1/136286; G02F 1/13306; G02F 1/13439
USPC ............ 349/46, 139, 144, 129, 128, 123, 141
See application file for complete search history.

(56) References Cited

U.S. PATENT DOCUMENTS

| 5,309,264 A * | 5/1994 | Lien ................. G02F 1/134336 349/130 |
| 8,107,027 B2 | 1/2012 | Kim |
| 8,253,668 B2 | 8/2012 | Kim et al. |
| 2005/0174503 A1* | 8/2005 | Kim et al. ........................ 349/46 |
| 2005/0280761 A1* | 12/2005 | Ishii ............................... 349/130 |
| 2006/0066799 A1* | 3/2006 | Mizusako et al. ............ 349/142 |
| 2009/0190058 A1* | 7/2009 | Jung et al. ........................ 349/48 |
| 2010/0020259 A1* | 1/2010 | Park .................... G02F 1/13624 349/48 |
| 2011/0170045 A1 | 7/2011 | Lee et al. |
| 2011/0187685 A1* | 8/2011 | Kwon ................... G02F 1/1343 345/206 |
| 2011/0273412 A1 | 11/2011 | Lee et al. |
| 2012/0026439 A1* | 2/2012 | Jung ................. G02F 1/133753 349/110 |
| 2012/0105785 A1* | 5/2012 | Kim et al. ...................... 349/139 |
| 2012/0133855 A1 | 5/2012 | Whangbo et al. |
| 2012/0154723 A1* | 6/2012 | Chang ............... G02F 1/133512 349/106 |
| 2012/0224128 A1* | 9/2012 | Jung et al. ..................... 349/129 |
| 2013/0069537 A1* | 3/2013 | Sun ...................... G09G 3/3233 315/123 |
| 2013/0208206 A1* | 8/2013 | Park et al. ........................ 349/46 |
| 2013/0215341 A1* | 8/2013 | Rho et al. ........................ 349/15 |

FOREIGN PATENT DOCUMENTS

| KR | 1020080086237 A | 9/2008 |
| KR | 1020120124012 A | 11/2012 |

\* cited by examiner

*Primary Examiner* — Sang V Nguyen
(74) *Attorney, Agent, or Firm* — Cantor Colburn LLP

(57) ABSTRACT

A liquid crystal display includes a first substrate and a second substrate facing each other, a pixel electrode disposed on the first substrate, a storage electrode line which is close to edges of the pixel electrode and spaced apart from the pixel electrode, a common electrode disposed on the second substrate, and a liquid crystal layer disposed between the first substrate and the second substrate, where the common electrode includes a first cutout having a cross shape, and the pixel electrode includes a second cutout which is close to at least one of the edges of the pixel electrode and disposed along the edge.

18 Claims, 11 Drawing Sheets

(a)

(b)

LIQUID CRYSTAL DISPLAY

This application claims priority to Korean Patent Application No. 10-2013-0101136 filed on Aug. 26, 2013, and all the benefits accruing therefrom under 35 U.S.C. §119, the entire contents of which are incorporated herein by reference.

BACKGROUND (a) Field

The invention relates to a liquid crystal display ("LCD"), and more particularly, to an LCD capable of effectively preventing generation of a change in an optical characteristic due to misalignments between an upper panel and a lower panel.

(b) Description of the Related Art

A liquid crystal display ("LCD") is one of the widely used flat panel displays currently, and includes two display panels on which electric field generating electrodes such as a pixel electrode and a common electrode are formed, and a liquid crystal layer between the two display panels. The LCD applies a voltage to the electric field generating electrode to generate an electric field in the liquid crystal layer, determines orientation of liquid crystal molecules of the liquid crystal layer through the generated electric field, and controls polarization of incident light, so as to display an image.

Among LCDs, a vertically aligned mode LCD of which a long axis of the liquid crystal molecule is aligned to be orthogonal to the display panel in a state where the electric field is not applied has been developed.

Securing an optical viewing angle is a big issue in the vertically aligned mode LCD, and accordingly, a method of forming a cutout such as a micro slit in the electric field generating electrode is used. Since the cutout or a protrusion determines a tilt direction of the liquid crystal molecule, the viewing angle can be expanded by distributing the tilt direction of the liquid crystal molecule in various directions through a proper arrangement of the cutout or the protrusion.

Particularly, in a method in which the micro slit is defined in the pixel electrode and thus a plurality of branch electrodes are provided, an aperture ratio of the LCD is effectively reduced.

SUMMARY

The invention has been made in an effort to provide a liquid crystal display ("LCD") which can improve an aperture ratio thereof while having a wide viewing angle and a quick response speed.

Further, the invention provides an LCD which can effectively prevent generation of a change in an optical characteristic due to misalignments between an upper panel and a lower panel.

An exemplary embodiment of the invention provides an LCD including a first substrate and a second substrate facing each other, a pixel electrode disposed on the first substrate, a storage electrode line which is close to edges of the pixel electrode and spaced apart from the pixel electrode, a common electrode disposed on the second substrate, and a liquid crystal layer disposed between the first substrate and the second substrate, where the common electrode includes a first cutout having a cross shape, and the pixel electrode includes a second cutout which is close to at least one of the edges of the pixel electrode and disposed along the edge.

In an exemplary embodiment the LCD may further include a gate line disposed on the first substrate in a first direction, and a data line disposed on the first substrate in a second direction, where the gate line and the data line may be disposed on different layers.

In an exemplary embodiment the storage electrode line and the data line may be disposed in or on a same layer.

In an exemplary embodiment the LCD may further include a first gate electrode, a second gate electrode, and a third gate electrode which protrude from the gate line, a first semiconductor layer, a second semiconductor layer, and a third semiconductor layer disposed on the first gate electrode, the second gate electrode, and the third gate electrode, respectively, a first source electrode and a second source electrode which protrude from the data line and disposed on the first semiconductor layer and the second semiconductor layer, respectively, a first drain electrode provided to be spaced apart from the first source electrode on the first semiconductor layer, a second drain electrode provided to be spaced apart from the second source electrode on the second semiconductor layer, a third source electrode which protrude from the storage electrode line and disposed on the third semiconductor layer, and a third drain electrode connected to the second drain electrode and provided to be spaced apart from the third source electrode on the third semiconductor layer.

In an exemplary embodiment the storage electrode line and the third source electrode may be disposed in or on a same layer.

In an exemplary embodiment the storage electrode line may include an upper storage electrode line and a lower storage electrode line, and the upper storage electrode line and the data line may be disposed in or on the same layer in parallel to each other.

In an exemplary embodiment the lower storage electrode line and the gate line may be disposed in or on a same layer in parallel to each other.

In an exemplary embodiment the upper storage electrode line and the lower storage electrode line may overlap each other.

In an exemplary embodiment the third semiconductor layer may be further disposed under the upper storage electrode line, and the lower storage electrode line may be disposed under the third semiconductor layer.

In an exemplary embodiment the pixel electrode may include a first subpixel electrode and a second subpixel electrode, the first subpixel electrode may be connected to the first drain electrode, and the second subpixel electrode may be connected to the second drain electrode.

In an exemplary embodiment the storage electrode line may be close to right edges of the first subpixel electrode and the second subpixel electrode.

In an exemplary embodiment the storage electrode line may be close to a right edge of the first subpixel electrode and a left edge of the second subpixel electrode.

In an exemplary embodiment the storage electrode line may be close to a left edge of the first subpixel electrode and a right edge of the second subpixel electrode.

In an exemplary embodiment the LCD may further include a first switching element and a second switching element connected to the gate line and the data line, and a third switching element connected to the gate line, the storage electrode line, and the second switching element, where the pixel electrode includes a first subpixel electrode and a second subpixel electrode, the first subpixel electrode is connected to the first switching element, and the second subpixel electrode is connected to the second switching element.

In an exemplary embodiment the storage electrode line may be close to right edges of the first subpixel electrode and the second subpixel electrode.

In an exemplary embodiment the storage electrode line may be close to a right edge of the first subpixel electrode and a left edge of the second subpixel electrode.

In an exemplary embodiment the storage electrode line may be close to a left edge of the first subpixel electrode and a right edge of the second subpixel electrode.

In an exemplary embodiment the storage electrode line may include an upper storage electrode line and a lower storage electrode line, and the upper storage electrode line and the data line may be disposed in or on the same layer in parallel to each other.

In an exemplary embodiment the lower storage electrode line and the gate line may be disposed in or on the same layer in parallel to each other.

In an exemplary embodiment the upper storage electrode line and the lower storage electrode line may overlap each other.

According to an exemplary embodiment of the invention, the LCD has the following effects.

The LCD according to the exemplary embodiment of the invention can widen a viewing angle, increase a response speed, and improve an aperture ratio.

Further, by forming the storage electrode line to be close to the edge of the pixel electrode and to be spaced apart from the pixel electrode, the optical characteristic may be constant even though the misalignments between the upper panel and the lower panel are generated.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
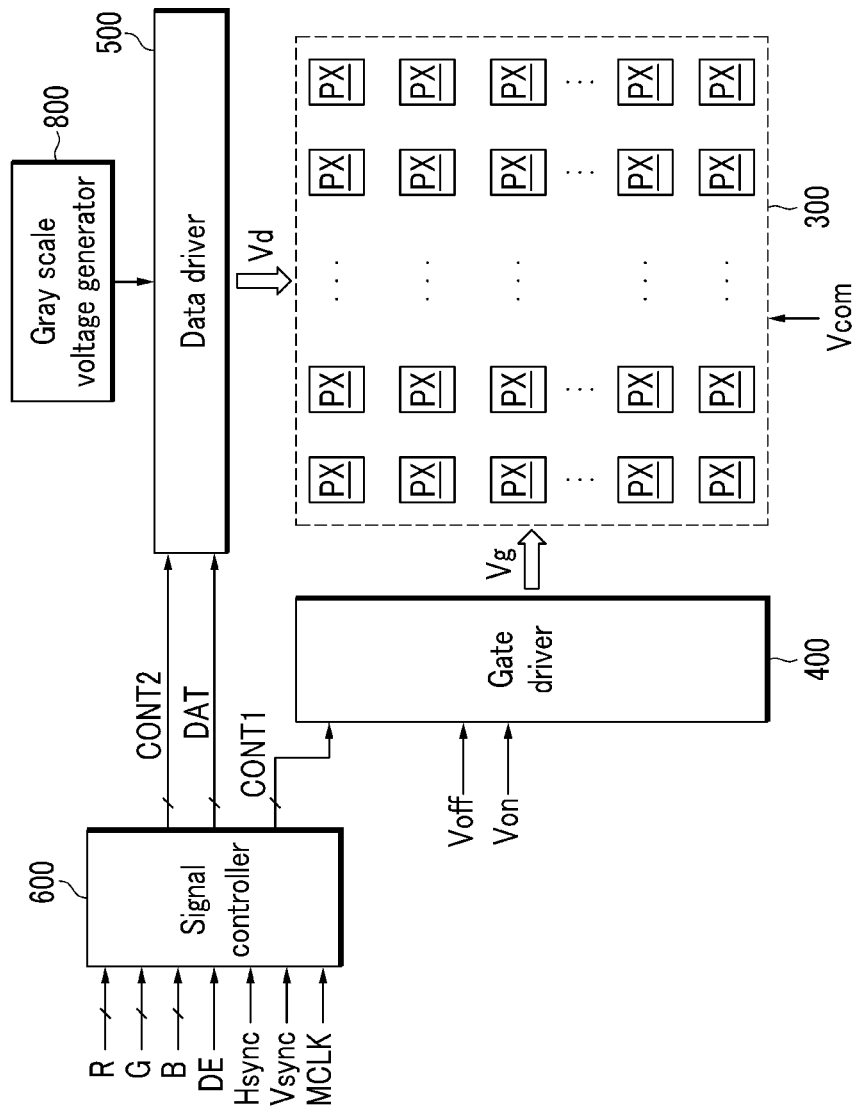
FIG. 1 is a block diagram of an exemplary embodiment of a liquid crystal display ("LCD") according to the invention.

Hereinafter, the invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, a liquid crystal display ("LCD") according to an exemplary embodiment of the invention will be described below with reference to the accompanying drawings.

Figure 2:
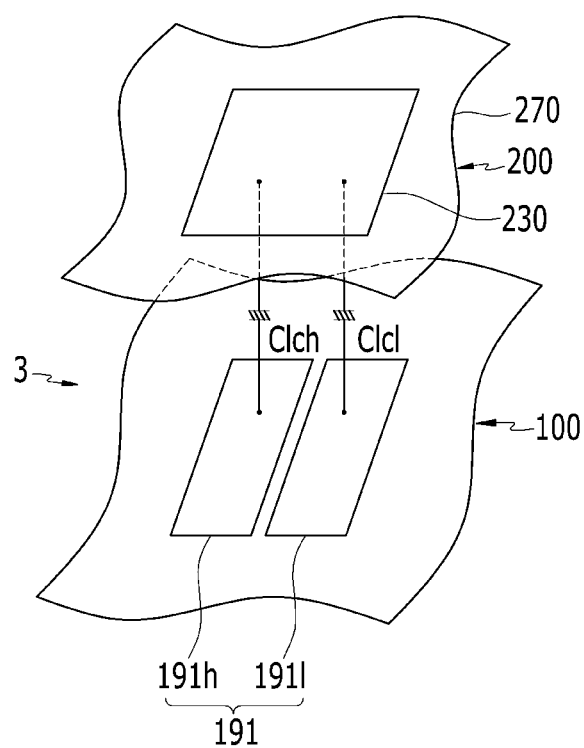
FIG. 2 is an equivalent circuit diagram illustrating one pixel together with a structure of the LCD illustrated in FIG. 1.

FIG. 1 is a block diagram illustrating an LCD according to an exemplary embodiment of the invention, and FIG. 2 is an equivalent circuit diagram illustrating one pixel together with a structure of the LCD illustrated in FIG. 1.

As illustrated in FIG. 1, the LCD according to the exemplary embodiment of the invention includes a liquid crystal panel assembly 300, a gate driver 400 and a data driver 500 connected to the liquid crystal panel assembly 300, a gray scale voltage generator 800 connected to the data driver 500, and a signal controller 600 controlling the liquid crystal panel assembly 300, the gate driver 400, the data driver 500 and the gray scale voltage generator 800.

In an exemplary embodiment, the signal controller 600 is supplied with input image signals R, G and B and input control signals controlling the display thereof from an external graphics controller (not shown). The input image signals R, G and B contains luminance information of each pixel PX, and the luminance has a predetermined number of, for example 1024(=210), 256(=28) or 64(=26) grays. The input control signals include a vertical synchronization signal Vsync, a horizontal synchronization signal Hsync, a main clock MCLK, and a data enable signal DE, etc.

The signal controller 600 processes the input image signals R, G, and B to be suitable for the operating condition of the liquid crystal panel assembly 300 and generates gate control signals CONT1 for controlling the gate driver 400 and data control signals CONT2 for controlling the data driver 500, as shown in FIG. 1.

Responding to the data control signals CONT2 from the signal controller 600, the data driver 500 receives digital image signals DAT for a row of pixels PX, converts the digital image signals DAT into analog data voltages selected from the gray voltages from the gray voltage generator 800, and then applies the analog data voltages to the corresponding data lines.

The vertical synchronization signal Vsync divides the input image signals R, G, and B by frames, that is, by images. The horizontal synchronization signal Hsync divides input image signals R, G, and B for a frame into several packets. For example, input image signals R, G, and B for pixels of the respective rows are divided by the horizontal synchronization signal Hsync.

The liquid crystal panel assembly 300 includes a plurality of signal lines (not illustrated) and a plurality of pixels PX connected to the plurality of signal lines and disposed approximately in a matrix form in an equivalent circuit. As illustrated in a structure of FIG. 2, the liquid crystal panel assembly 300 includes a lower panel 100 and an upper panel 200 facing each other, and a liquid crystal layer 3 injected therebetween.

The signal lines include a plurality of gate lines (not illustrated), also referred to as "scan lines", transmitting gate signals and a plurality of data lines (not illustrated) transmitting data voltages. The gate lines extend approximately in a row direction nearly in parallel to each other, and the data lines extend approximately in a column direction nearly in parallel to each other.

Each of the pixels PX includes a pair of subpixels, and each of the subpixels includes liquid crystal capacitors Clch and Clcl. At least one of the two subpixels includes a gate line, a data line, and a switching element (refers to FIG. 3) connected to the liquid crystal capacitors Clch and Clcl.

The liquid crystal capacitors Clch and Clcl have first and second subpixel electrodes 191h and 191l of the lower panel 100, and a common electrode 270 of the upper panel 200 as two terminals, respectively, and the liquid crystal layer 3 between the first and second subpixel electrodes 191h and 191l and the common electrode 270 serves as a dielectric material. The first and second subpixel electrodes 191h and 191l are separated from each other and constitute one pixel electrode 191. The common electrode 270 is disposed on an entire surface of the upper panel 200 and receives a common voltage Vcom. The liquid crystal layer 3 may have negative dielectric anisotropy.

In order to realize a color expression, each pixel PX is allowed to inherently express one of the primary colors (spatial division) or allowed to alternately express the primary colors according to a time (temporal division), thereby recognizing a desired color by a spatial and temporal sum of the primary colors. In exemplary embodiments, the primary colors may include three primary colors such as red, green, and blue, for example. FIG. 2 shows an exemplary embodiment of a spatial division in which each pixel PX includes a color filter 230 indicating one of the primary colors in an area of the upper panel 200. Unlike FIG. 2, in another exemplary embodiment, the color filter 230 may be disposed on or under the first and second subpixel electrodes 191h and 191l of the lower panel 100.

At least one polarizer (not illustrated) polarizing light is attached to an outer side of the liquid crystal panel assembly 300.

Referring back to FIG. 1, the gray scale voltage generator 800 generates a total gray scale voltage related to transmittance of the pixel PX or a limited number of gray scale voltages (hereinafter, referred to as "reference gray scale voltages"). The total or reference gray scale voltage may include voltages having a positive value and a negative value with respect to the common voltage Vcom.

The gate driver 400 is connected to gate lines of the liquid crystal panel assembly 300 and applies a gate signal Vg including a combination of a gate on voltage Von and a gate off voltage Voff to the gate lines.

The data driver 500 is connected to data lines of the liquid crystal panel assembly 300, selects a gray scale voltage from the gray scale voltage generator 800, and applies the selected gray scale voltage to the data lines as a data voltage Vd. However, when the gray scale voltage generator 800 provides only a predetermined number of reference gray scale voltages, not all voltages for the total gray scales, the data driver 500 divides the reference gray scale voltage, generates gray scale voltages for all the gray scales, and selects the data voltage from the generated gray scale voltages.

Each of the driving apparatuses 400, 500, 600, and 800 may be directly mounted onto the liquid crystal panel assembly 300 in at least one integrated circuit ("IC") chip form, may be mounted onto a flexible printed circuit film (not illustrated) to be attached to the liquid crystal panel assembly 400 in a tape carrier package ("TCP") form, or may be mounted onto a separate printed circuit board (not illustrated). In another exemplary embodiment, the driving apparatuses 400, 500, 600, and 800 may be integrated into the liquid crystal panel assembly 300 together with the signal lines and the switching element. Further, the driving apparatuses 400, 500, 600, and 800 may be integrated as a single chip. In this case, at least one of the driving apparatuses or at least one circuit element included in the driving apparatuses may be located outside the single chip.

Subsequently, the LCD according to the exemplary embodiment of the invention will be described in more detail with reference to FIGS. 1, 2 and 3 to 6.

Figure 3:
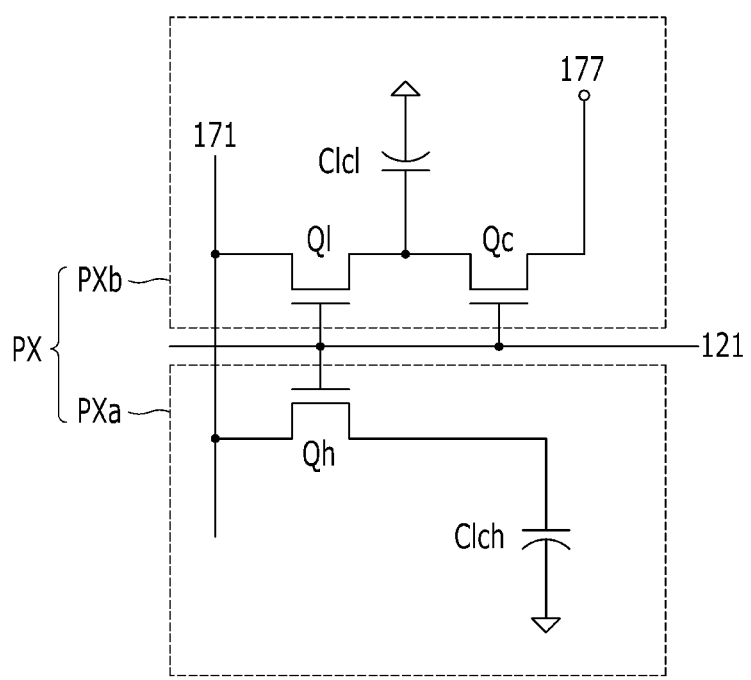
FIG. 3 is an equivalent circuit diagram of an exemplary embodiment of one pixel of a LCD according to the invention.
Figure 4:
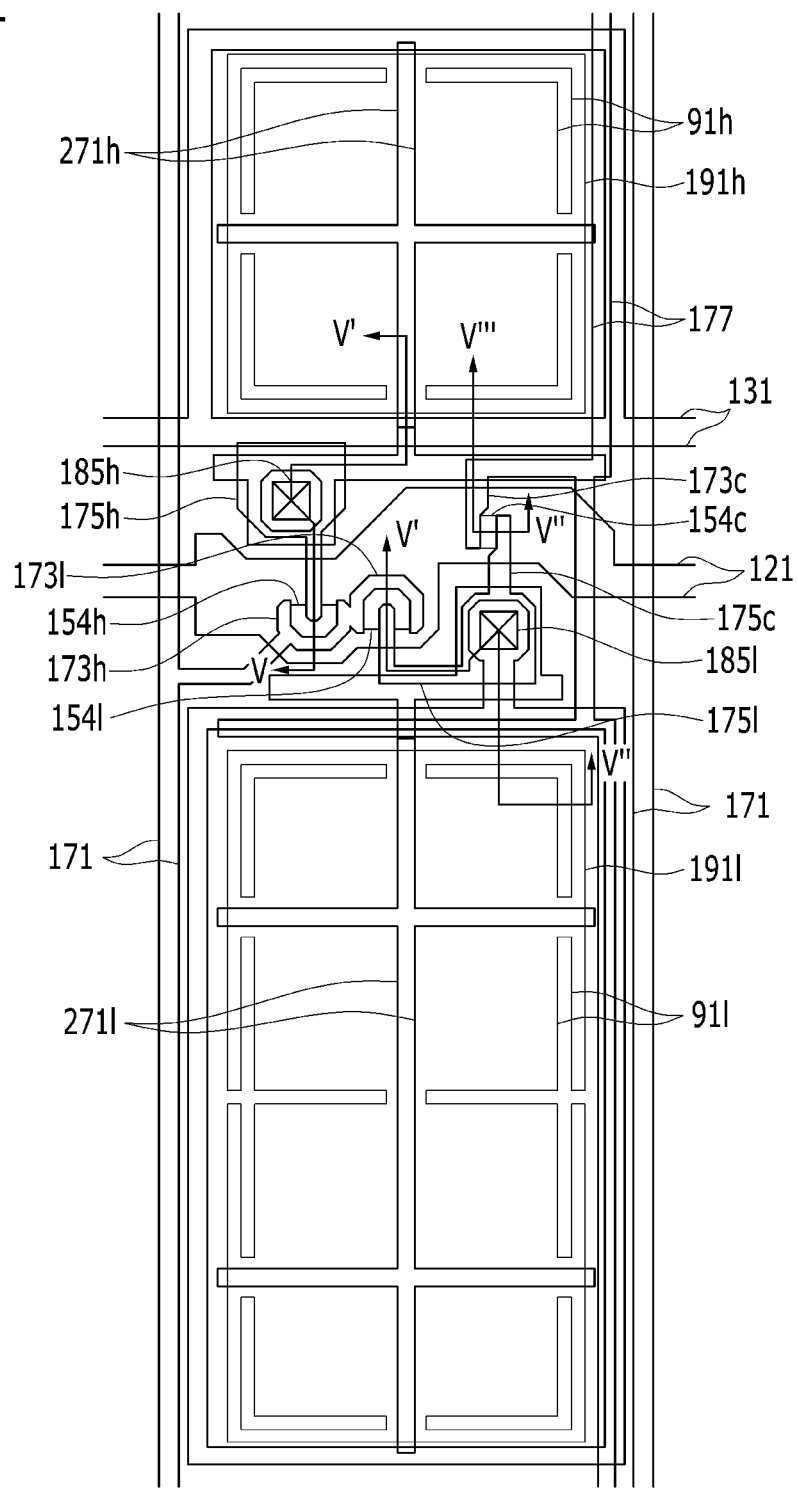
FIG. 4 is a top plan view of an exemplary embodiment of one pixel of a LCD according to the invention.
Figure 5:
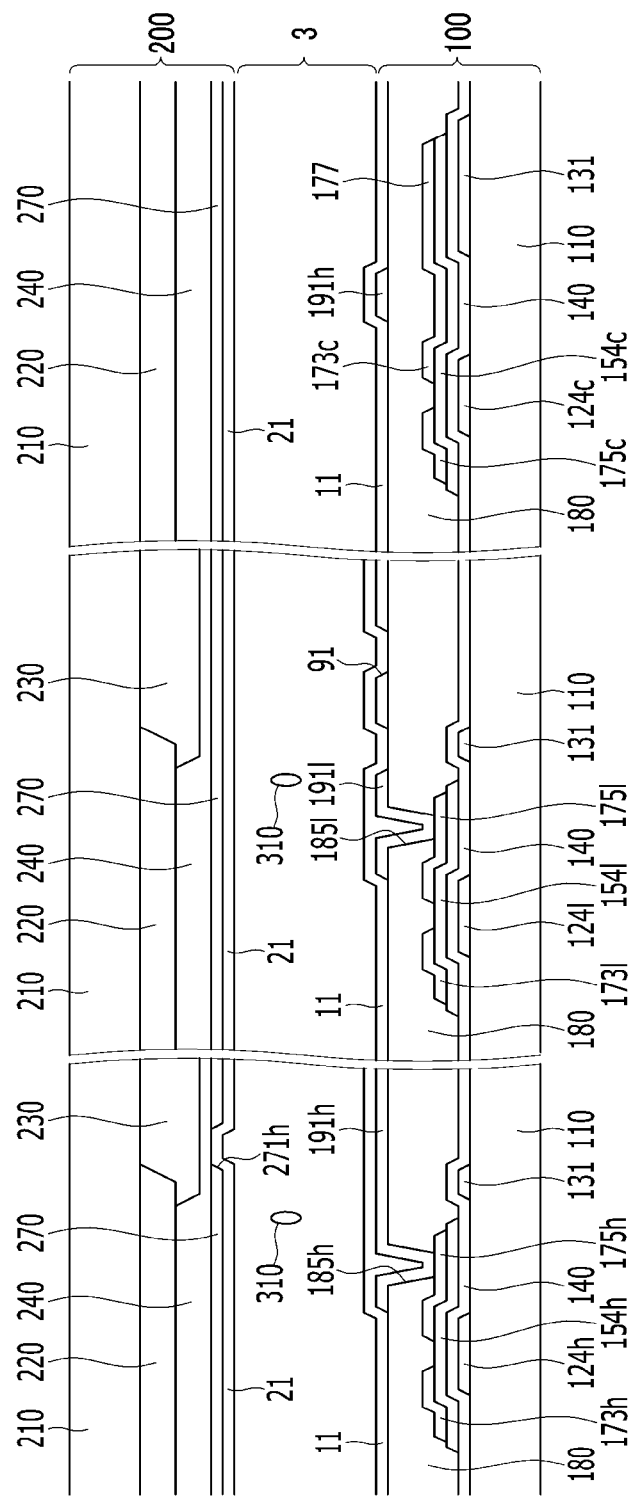
FIG. 5 is a cross-sectional view of an exemplary embodiment of a LCD according to the invention taken along lines V-V', V'-V'', and V'''-V''' of FIG. 4.
Figure 6:
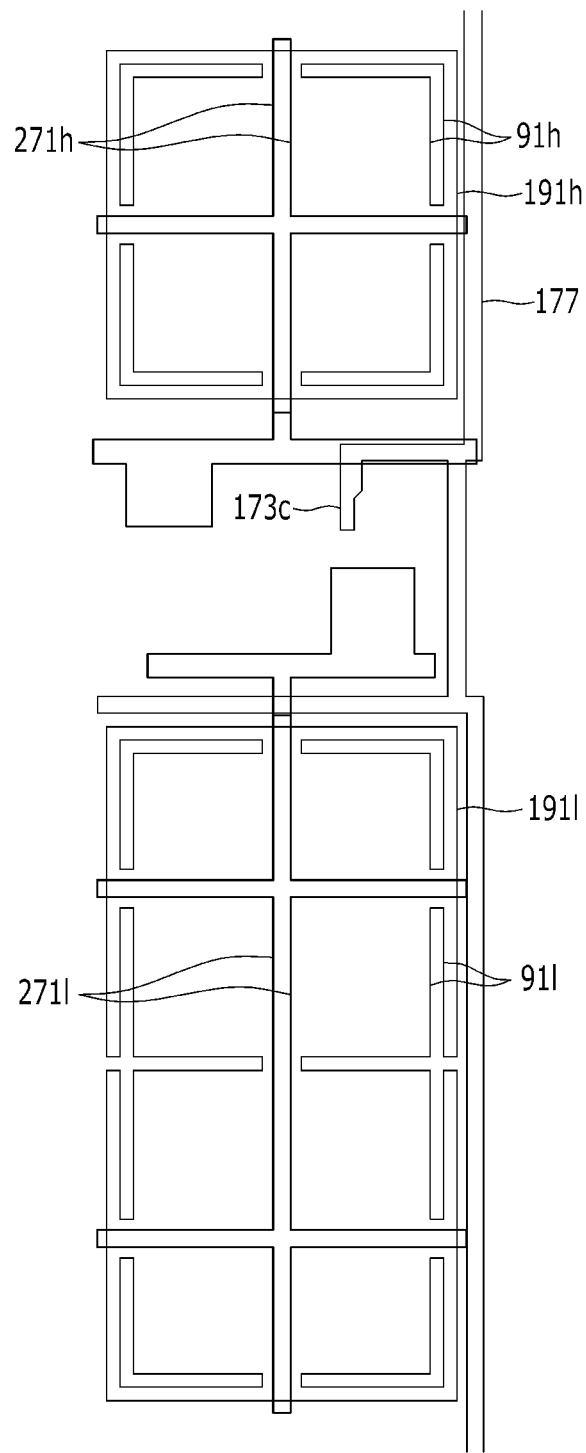
FIG. 6 is a top plan view illustrating an exemplary embodiment of some components of one pixel of a LCD according to the invention.

FIG. 3 is an equivalent circuit diagram of one pixel of the LCD according to an exemplary embodiment of the invention, FIG. 4 is a top plan view of one pixel of the LCD according to an exemplary embodiment of the invention, and FIG. 5 is a cross-sectional view of the LCD according to an exemplary embodiment of the invention taken along lines V-V', V'-V", and V"-V'" of FIG. 4. FIG. 6 is a top plan view illustrating some components of one pixel of the LCD according to an exemplary embodiment of the invention. FIG. 6 illustrates a pixel electrode, an upper storage electrode line, and a cutout of a common electrode.

Referring first to FIGS. 1 to 3, the LCD according to the exemplary embodiment of the invention includes a plurality of signal lines 121, 171, and 177 and a plurality of pixels PX connected to the signal lines.

The signal lines 121, 171, and 177 include a gate line 121 transmitting a gate signal (also referred to as a "scan signal"), a data line 171 transmitting a data voltage, and an upper storage electrode line 177 receiving a constant voltage.

A first switching element Qh and a second switching element Ql that are connected to the same gate line 121 and the same data line 171 are provided. Further, a third switching element Qc that is connected to the second switching element Ql and the upper storage electrode line 177 is further provided, the third switching element Qc and the first and second switching elements Qh and Ql being connected to the same gate line 121. In an exemplary embodiment, the first to third switching elements Qh, Ql, and Qc may include a thin film transistor and the like.

Each of the pixels PX includes two subpixels PXa and PXb. A first liquid crystal capacitor Clch connected to the first switching element Qh is provided at the first subpixel PXa, and a second liquid crystal capacitor Clcl connected to the second switching element Ql is provided at the second subpixel PXb.

A first terminal of the first switching element Qh is connected to the gate line 121, a second terminal of the first switching element Qh is connected to the data line 171, and a third terminal of the first switching element Qh is connected to the first liquid crystal capacitor Clch. Particularly, the third terminal of the first switching element Qh is connected to the first subpixel electrode 191h (refers to FIG. 2) included in the first liquid crystal capacitor Clch.

A first terminal of the second switching element Ql is connected to the gate line 121, a second terminal of the second switching element Ql is connected to the data line 171, and a third terminal of the second switching element Ql is connected to the second liquid crystal capacitor Clcl. Particularly, the third terminal of the second switching element Ql is connected to the second subpixel electrode 191l (refers to FIG. 2) included in the second liquid crystal capacitor Clcl.

A first terminal of the third switching element Qc is connected to the gate line 121, a second terminal of the third switching element Qc is connected to the upper storage electrode line 177, and a third terminal of the third switching element Qc is connected to the third terminal of the second switching element Ql.

An operation of the LCD according to the exemplary embodiment of the invention will be described. When the gate on voltage is applied to the gate line 121, the first to third switching elements Qh, Ql, and Qc connected to the gate line 121 are all turned on, and the first liquid crystal capacitor Clch and the second liquid crystal capacitor Clcl are charged by a data voltage transmitted through the data line 171.

At this time, since the third switching element Qc is turned on, the data voltage transmitted to the second subpixel PXb through the data line 171 is divided through the third switching element Qc connected to the second switching element Ql in series. At this time, the voltage is distributed according to sizes of channels of the second switching element Ql and the third switching element Qc. Accordingly, even though the data voltages transmitted to the first subpixel PXa and the second subpixel PXb through the data lines 171 are the same, the voltages charged in the first liquid crystal capacitor Clch and the second liquid crystal capacitor Clcl are different. That is, the voltage charged in the second liquid crystal capacitor Clcl is lower than the voltage charged in the first liquid crystal capacitor Clch. Accordingly, side visibility can be improved based on different voltages charged in the first and second subpixels PXa and PXb, respectively, within the same pixel PX.

Hereinafter, a structure of one pixel of the LCD according to the exemplary embodiment of the invention will be described with reference to FIGS. 4 and 5 mainly. The LCD according to the exemplary embodiment of the invention includes the lower panel 100 and the upper panel 200 that face each other, and the liquid crystal layer 3 injected between the two panels 100 and 200.

First, the lower panel 100 will be described.

The gate lines 121 and lower storage electrode lines 131 are unidirectionally disposed on a first substrate 110 including a transparent glass or plastic.

The gate lines 121 mainly extend in a horizontal direction and transmit a gate signal. Further, a first gate electrode 124h and a second gate electrode 124l that protrude from the gate line 121 and are connected to each other are provided. In addition, a third gate electrode 124c that protrudes from the gate line 121 and is spaced apart from the first gate electrode 124h and the second gate electrode 124l is provided. The first to third gate electrodes 124h, 124l, and 124c are connected to the same gate line 121 and receive the same gate signal.

The lower storage electrode lines 131 extend in the same direction as that of the gate line 121 and receive a constant voltage. Further, the lower storage electrode lines 131 may be further provided to surround at least some of the pixel electrodes 191. In an exemplary embodiment, as illustrated in the drawings, the lower storage electrode line 131 may be provided to surround all of four edges of the first subpixel electrode 191h and the second subpixel electrode 191l. At this time, the lower storage electrode line 131 may be provided to be close to the edges of the pixel electrode 191 and spaced apart from the pixel electrode 191.

A gate insulating layer 140 is disposed on the gate line 121, the first to third gate electrodes 124h, 124l, and 124c and the lower storage electrode 131. In an exemplary embodiment, the gate insulating layer 140 may include an inorganic insulating material such as silicon nitride (SiNx) or silicon oxide (SiOx). Further, the gate insulating layer 140 may be provided as a single layer or a multi-layer.

A first semiconductor layer 154h, a second semiconductor layer 154l, and a third semiconductor layer 154c are disposed on the gate insulating layer 140. The first semiconductor layer 154h may be located on the first gate electrode 124h, the second semiconductor layer 154l may be located on the second gate electrode 124l, and the third semiconductor layer 154c may be located on the third gate electrode 124c.

The data line 171, the upper storage electrode line 177, a first source electrode 173h, a first drain electrode 175h, a second source electrode 173l, a second drain electrode 175l, a third source electrode 173c and a third drain electrode 175c are disposed on the first to third semiconductor layers 154h, 154l, and 154c, and the gate insulating layer 140. In an exemplary embodiment, the upper storage electrode line 177 or the lower storage electrode line 131 may be disposed in and/or on a same layer. In an exemplary embodiment, and the third source electrode 173c may be disposed in and/or on a same layer. In an exemplary embodiment, the upper storage electrode line 177 and the data line 171 may be disposed in and/or on the same layer in parallel to each other. In an exemplary embodiment, the lower storage electrode line 131 and the gate line 121 may be disposed in and/or on a same layer in parallel to each other.

The first to third semiconductor layers 154h, 154l, and 154c may be disposed on the first to third gate electrodes 124h, 124l, and 124c, and also may be disposed under the data line 171 and the upper storage electrode line 177. In an exemplary embodiment, the first semiconductor layer 154h may be further disposed under the data line 171, and the third semiconductor layer 154c may be further disposed under the upper storage electrode line 177. Further, the second semiconductor layer 154l and the third semiconductor layer 154c may be provided to be connected to each other. However, the invention is not limited thereto. The first to third semiconductor layers 154h, 154l, and 154c may be disposed only on the first to third gate electrodes 124h, 124l, and 124c, and the second semiconductor layer 154l and the third semiconductor layer 154c may be provided to be separated from each other.

The data line 171 transmits the data voltage and extends mainly in a vertical direction to cross the gate line 121.

The upper storage electrode line 177 extends in the same direction as that of the data line 171 and receives a constant voltage. In an exemplary embodiment, the same voltage may be applied to the upper storage electrode line 177 and the lower storage electrode line 131. Further, the upper storage electrode lines 177 may be further provided to surround at least some of the pixel electrodes 191. In an exemplary embodiment, as illustrated in the drawings, the upper storage electrode lines 177 may be provided to surround a right edge of the first subpixel electrode 191h and right and upper edges of the second subpixel electrode 191l. At this time, the upper storage electrode line 177 may be provided to be close to the edges of the pixel electrode 191 and spaced apart from the pixel electrode 191.

The upper storage electrode line 177 and the lower storage electrode line 131 are located between the data line 171 and the pixel electrode 191. As the pixel electrode 191 is disposed to be close to the data line 171, the pixel electrode 191 is influenced from the voltage applied to the data line 171. According to the exemplary embodiment of the invention, as the upper storage electrode line 177 and the lower storage electrode line 131 receiving the constant voltage are disposed between the data line 171 and the pixel electrode 191, an electric field generated between the pixel electrode 191 and the data line 171 can be weakened, and accordingly, a vertical cross talk can be effectively reduced.

The upper storage electrode line 177 may be provided to overlap at least a part of the lower storage electrode line 131. In an exemplary embodiment, as illustrated in the drawings, the upper storage electrode line 177 and the lower storage electrode line 131 may overlap in the right edge of the first subpixel electrode 191h and the right and upper edges of the second subpixel electrode 191l. As illustrated in the drawings, the upper storage electrode line 177 and the lower storage electrode line 131 may partially overlap, or the upper storage electrode line 177 may wholly overlap the lower storage electrode line 131.

As described above, the third semiconductor layer 154c may be further disposed under the upper storage electrode line 177. In this case, as the lower storage electrode line 131 overlaps the upper storage electrode line 177, the lower storage electrode line 131 is located under the third semiconductor layer 154c, and the lower storage electrode line 131 blocks light incident to the third semiconductor layer 154c, so as to effectively prevent the generation of photocurrent.

The first source electrode 173h is provided to protrude from the data line 171 on the first gate electrode 124h. The first source electrode 173h may have a bent C shape on the first gate electrode 124h.

The first drain electrode 175h is provided to be spaced apart from the first source electrode 173h on the first gate electrode 124h. A channel is disposed on the first semiconductor layer 154h corresponding to an exposed part between the first source electrode 173h and the first drain electrode 175h spaced apart from each other.

The second source electrode 173l is provided to protrude from the data line 171 on the second gate electrode 124l. The second source electrode 173l may have a bent C shape on the second gate electrode 124l.

The second drain electrode 175l is provided to be spaced apart from the second source electrode 173l on the second gate electrode 124l. A channel is disposed on the second semiconductor layer 154l corresponding to an exposed part between the second source electrode 173l and the second drain electrode 175l spaced apart from each other.

The third source electrode 173c is provided to protrude from the upper storage electrode line 177 on the third gate electrode 124c. The third source electrode 173c is connected to the upper storage electrode line 177 to receive a constant voltage.

The third drain electrode 175c is connected to the second drain electrode 175l and provided to be spaced apart from the third source electrode 173c on the third gate electrode 124c. A channel is disposed on the third semiconductor layer 154c corresponding to an exposed part between the third source electrode 173c and the third drain electrode 175c spaced apart from each other.

The aforementioned first gate electrode 124h, first semiconductor layer 154h, first source electrode 173h, and first drain electrode 175h constitute the first switching element. Further, the second gate electrode 124l, the second semiconductor layer 154l, the second source electrode 173l, and the second drain electrode 175l constitute the second switching element, and the third gate electrode 124c, the third semiconductor layer 154c, the third source electrode 173c, and the third drain electrode 175c constitute the third switching element.

A passivation layer 180 is disposed on the data line 171, the first to third source electrodes 173h, 173l, and 173c, and the first to third drain electrodes 175h, 175l, and 175c. In exemplary embodiments, the passivation layer 180 may include an organic insulating material or an inorganic insulating material, and provided as a single layer or multi-layer. In the exemplary embodiments, the organic insulating material may be provided by a color filter.

A first contact hole 185h is defined in the passivation layer 180 such that at least a part of the first drain electrode 175h is exposed, and a second contact hole 185l is defined in the passivation layer 180 such that at least a part of the second drain electrode 175l is exposed.

The pixel electrode 191 including the first subpixel electrode 191h and the second subpixel electrode 191l is disposed on the passivation layer 180.

The first subpixel electrode 191h is connected to the first drain electrode 175h through the first contact hole 185h, and the second subpixel electrode 191l is connected to the second drain electrode 175l through the second contact hole 185l.

The first subpixel electrode 191h and the second subpixel electrode 191l receive the data voltage from the first drain electrode 175h and the second drain electrode 175l, respectively. At this time, a part of the data voltage applied to the second drain electrode 175l is divided through the third source electrode 173c, and thus a size of a second subpixel voltage applied to the second subpixel electrode 191l becomes smaller than a size of a first subpixel voltage applied to the first subpixel electrode 191h. The above description corresponds to a case where the data voltage applied to the first subpixel electrode 191h and the second subpixel electrode 191l has a positive polarity. In contrast, when the data voltage applied to the first subpixel electrode 191h and the second subpixel electrode 191l has a negative polarity, the first subpixel voltage applied to the first subpixel electrode 191h becomes smaller than the second subpixel voltage applied to the second subpixel electrode 191l.

The second subpixel voltage applied to the second subpixel electrode 191l may be equal to or smaller than about 0.9 times of the first subpixel voltage applied to the first subpixel electrode 191h.

The first subpixel electrode 191h and the second subpixel electrode 191l receiving the data voltages generate an electric field together with the common electrode 270 of the upper panel 200 to determine a direction of liquid crystal molecules 310 of the liquid crystal layer 3 between the two electrodes 191 and 270. According to the direction of the liquid crystal molecules 310 determined as described above, luminance of the light penetrating the liquid crystal layer 3 is changed.

The first subpixel electrode 191h, the common electrode 270, and the liquid crystal layer 3 between the first subpixel electrode 191h and the common electrode 270 constitute the first liquid crystal capacitor Clch, and the second subpixel electrode 191l, the common electrode 270, and the liquid crystal layer 3 between the second subpixel electrode 191l and the common electrode 270 constitute the second liquid crystal capacitor Clcl, so as to maintain the applied voltage even after each of the first and second switching elements Qh and Ql is turned off.

The pixel electrode 191 is provided as a substantially quadrangular shape, and cutouts 91h and 91l that are close to at least one of the edges of the pixel electrode 191 are defined in the pixel electrode 191 along the edge thereof.

A first alignment layer 11 is disposed on the pixel electrode 191 and the passivation layer 180. In exemplary embodiments, the first alignment layer 11 may be a vertical alignment layer or an alignment layer optically aligned using a photopolymer.

Next, the upper panel 200 will be described.

A light blocking member 220 is disposed on a second substrate 210. The light blocking member 220 may include a black matrix and effectively prevents a light leakage. The light blocking member 220 may be provided to overlap an edge of a pixel area where the pixel electrode 191 is provided and the first to third switching elements Qh, Ql, and Qc.

A plurality of color filters 230 is disposed on the second substrate 210. The color filter 230 exists within most areas surrounded by the light blocking member 220, and may extend along a column of the pixel electrode 191. An edge of the color filter 230 may partially overlap the light blocking member 220. In an exemplary embodiment, each color filter may express one of the primary colors such as three primary colors including red, green, and blue. However, the colors displayed by the color filter 230 are not limited to the three primary colors such as red, green and blue, and the color filter 230 may express one of cyan, magenta, yellow and colors in the white spectrum.

At least one of the light blocking member 220 and the color filter 230 may be disposed on the first substrate 110.

An overcoat 240 may be disposed on the light blocking member 220 and the color filter 230.

The common electrode 270 is disposed on the overcoat 240. Cutouts 271h and 271l having a cross shape may be defined in the common electrode 270.

A second alignment layer 21 is disposed on the common electrode 270. In exemplary embodiments, the second alignment layer 21 may be a vertical alignment layer or an alignment layer optically aligned using a photopolymer.

Polarizers (not illustrated) may be located at outer surfaces of the lower panel 100 and the upper panel 200. Polarization axes of the two polarizers are orthogonal, and one of the two polarization axes may be provided in parallel with respect to the gate line 121. In a reflective display device, one of the two polarizers may be omitted.

According to the exemplary embodiment of the invention, the upper storage electrode line 177 and the lower storage electrode line 131 are disposed at the edges of the pixel electrode 191. It may be assumed that the storage electrode line is provided to overlap a center of the pixel electrode 191, that is, the cutouts 271h and 271l of the common electrode 270. At this time, when the misalignment between the lower panel 100 and the upper panel 200 is generated, light cannot penetrate a part where the storage electrode line is disposed, and thus an optical characteristic is changed. According to the exemplary embodiment of the invention, by arranging the upper storage electrode line 177 and the lower storage electrode line 131 at the edges of the pixel electrode 191, the optical characteristic may remain steady even though the misalignment between the lower panel 100 and the upper panel 200 is generated.

Hereinafter, a basic area of the electric field generating electrode of the display device according to an exemplary embodiment of the invention will be described with reference to FIG. 7.

Figure 7:
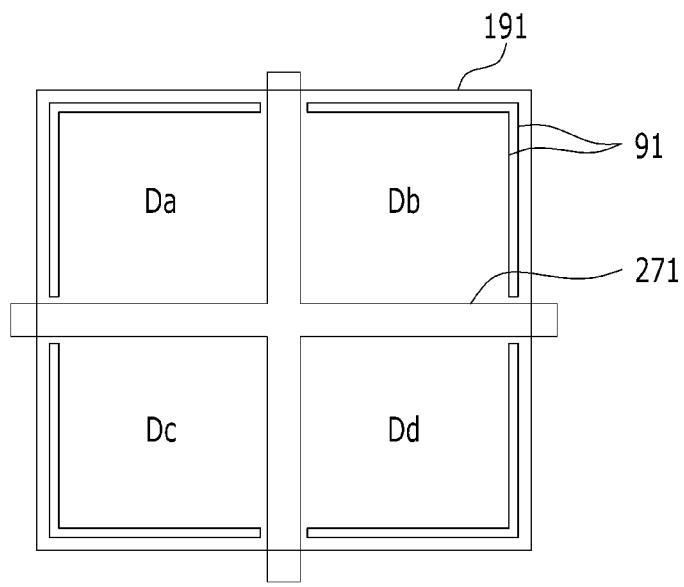
FIG. 7 is a top plan view illustrating an exemplary embodiment of a basic area of an electric field generating electrode of the display device according to the invention.

FIG. 7 is a top plan view illustrating a basic area of the electric field generating electrode of the display device according to the exemplary embodiment of the invention.

As illustrated in FIG. 7, the basic area of the electric field generating electrode includes the pixel electrode 191 facing the cutout 271 of the common electrode 270 and the cutout 91 of the pixel electrode 191 surrounding the cutout 271 of the common electrode 270. Viewed from the top of the display device, the basic area defined by the cutout 271 of the common electrode 270 and the edges of the pixel electrode 191 may be divided into a plurality of smaller areas Da, Db, Dc, and Dd, and the plurality of smaller areas may be symmetrical to each other with respect to the cutout 271 of the common electrode 270.

As described above, viewed in a plane form, the cutout 271 of the common electrode 270 may have the cross shape and the end of the cutout 271 more protrudes in comparison with the edges of the corresponding pixel electrode 191. A width of the cutout 271 of the common electrode 270 taken in a plan view may approximately range from about 2 micrometers (μm) to about 10 μm. The width may be taken perpendicular to an extension direction of the respective portion of the cutout 271 of the common electrode 270.

The cutout 91 of the pixel electrode 191 is defined nearly in a quadrangular hook shape along the edges of the pixel electrode 191 and disconnected near parts corresponding to ends of the cutout 271 of the common electrode 270. As described above, the parts where the cutout 91 defined on the pixel electrode 191 is disconnected become connection parts of the pixel electrode 191. A width of the connection part of the pixel electrode 191 is wider than a width of the corresponding cutout 271 of the common electrode 270, taken in a same direction as the width of the corresponding cutout 271.

The cutout 91 of the pixel electrode 191 may be provided on a position spaced apart from the edge of the pixel electrode 191 at an interval equal to or smaller than twice a cell interval of the display device, and it is preferable that a width of the cutout 91 is equal to or smaller than twice the cell interval of the display device.

It is preferable that the width of the cutout 271 in the cross shape is equal to or smaller than a thickness of the liquid crystal layer, that is, about triple the cell interval.

In the display device according to the exemplary embodiment, although it has been described that the cutout having the cross shape is defined on the common electrode, the cutout may be defined on at least one of the pixel electrode and the common electrode which are the electric field generating electrodes. Specifically, the cutout having the cross shape may be defined on the pixel electrode or on both the pixel electrode and the common electrode.

Then, the basic area of the electric field generating electrode of the display device according to another exemplary embodiment of the invention will be described with reference to FIG. 8.

Figure 8:
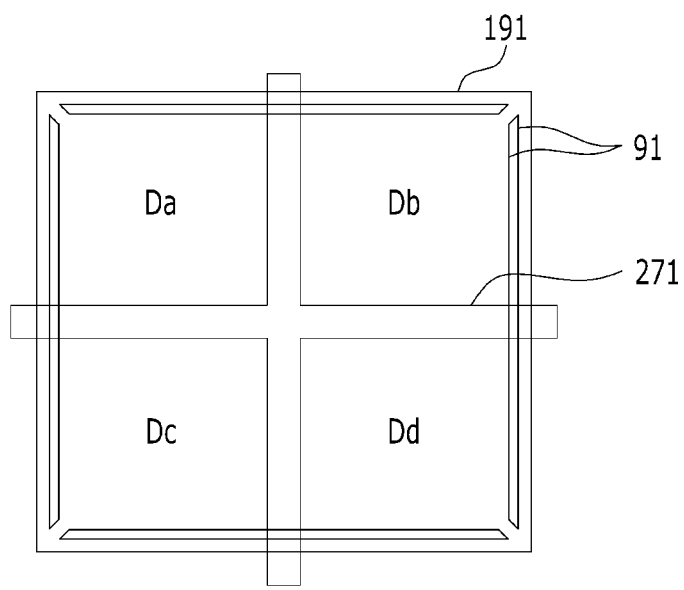
FIG. 8 is a top plan view illustrating another exemplary embodiment of a basic area of an electric field generating electrode of the display device according to the invention.

FIG. 8 is a top plan view illustrating the basic area of the electric field generating electrode of the display according to another exemplary embodiment of the invention.

As illustrated in FIG. 8, the basic area of the electric field generating electrode includes the pixel electrode 191 facing the cutout 271 of the common electrode 270. The cutout 91 of the pixel electrode 191 surrounding the cutout 271 of the common electrode 270 is defined in the pixel electrode 191. Viewed from the top of the display device, the basic area defined by the cutout 271 of the common electrode 270 and the edges of the pixel electrode 191 may be divided into a plurality of sub areas Da, Db, Dc, and Dd, and the plurality of sub areas may be symmetrical to each other with respect to the cutout 271 of the common electrode 270.

As described above, viewed as a plan form, the cutout 271 of the common electrode 270 may have the cross shape and the end of the cutout 271 more protrudes in comparison with the edges of the corresponding pixel electrode 191. A width of the cutout 271 of the common electrode 270 may approximately range from about 2 μm to about 10 μm.

The cutout 91 of the pixel electrode 191 is provided nearly in a quadrangular hook shape along the edges of the pixel electrode 191 and disconnected in four parts where the edges of the pixel electrode 191 extending in different directions meet, that is, parts close to corners of the pixel electrode 191. As described above, the parts where the cutout 91 is disconnected defined on the pixel electrode 191 is disconnected become connection parts of the pixel electrode 191. Unlike the aforementioned exemplary embodiment illustrated in FIG. 7, the cutout 91 of the pixel electrode 191 partially overlaps the cutout 271 of the common electrode 270.

The cutout 91 of the pixel electrode 191 may be disposed on a position spaced apart from the edge of the pixel electrode 191 at an interval equal to or smaller than twice the cell interval of the display device, and it is preferable that the width of the cutout 91 is equal to or smaller than twice the cell interval of the display device.

It is preferable that the width of the cutout 271 in the cross shape is equal to or smaller than the thickness of the liquid crystal layer, that is, about triple the cell interval.

In the display device according to the exemplary embodiment, although it has been described that the cutout having the cross shape is defined on the common electrode, the cutout may be defined on at least one of the pixel electrode and the common electrode which are the electric field generating electrodes. Specifically, the cutout having the cross shape may be defined on the pixel electrode or on both the pixel electrode and the common electrode.

Then, a method of initially orienting the liquid crystal molecules 310 such that the liquid crystal molecules 310 have a pre-tilt will be described with reference to FIGS. 9 and 10.

Figure 9:
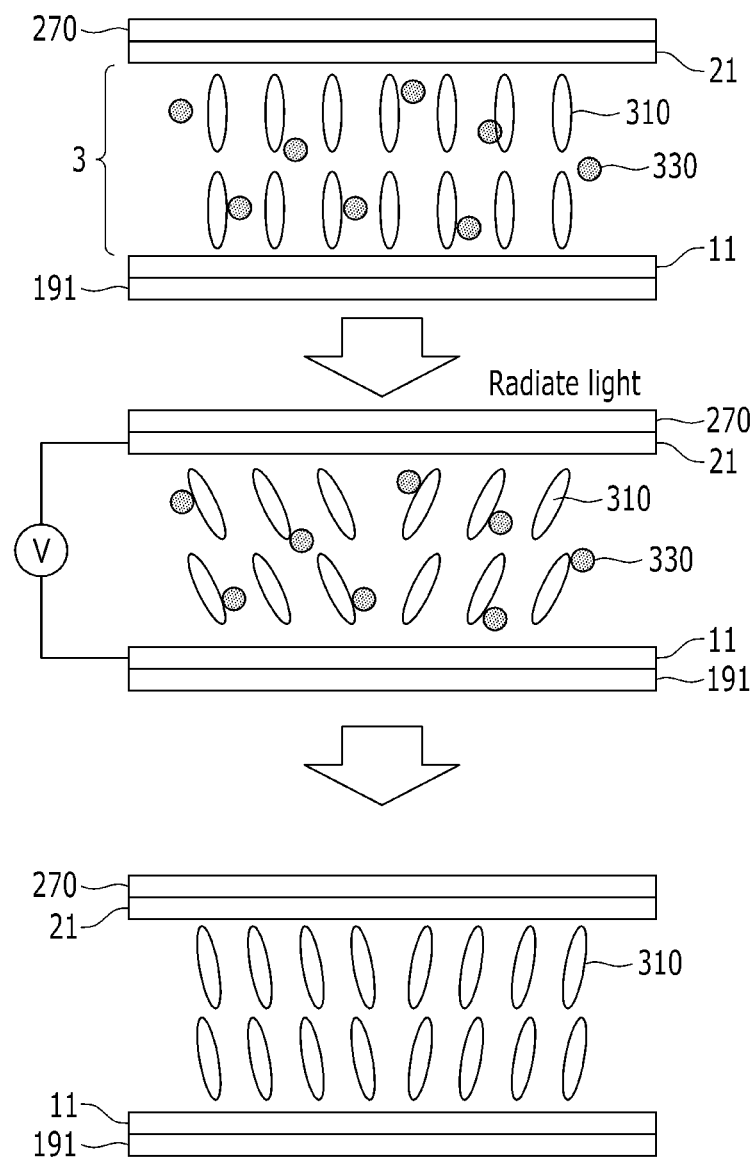
FIG. 9 is a view illustrating a process of making liquid crystal molecules have a pre-tilt by using a prepolymer polymerized by light such as ultraviolet rays.
Figure 10:
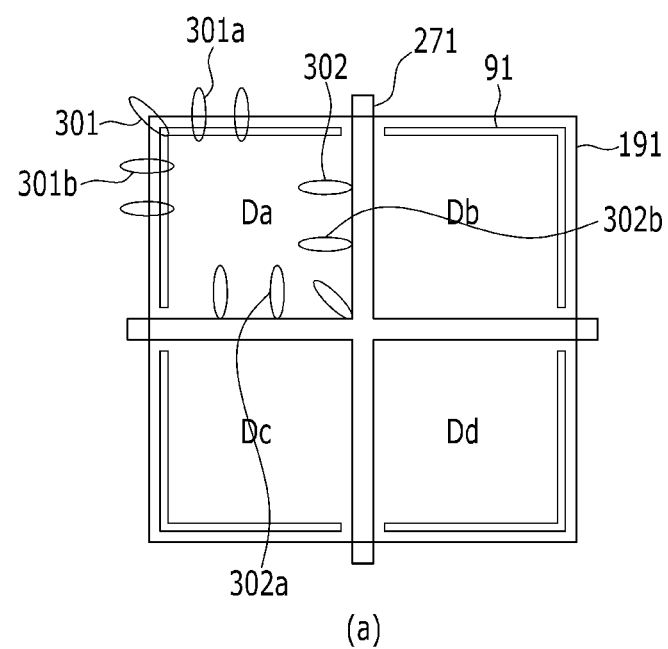
FIG. 10 conceptually illustrates an exemplary embodiment of a liquid crystal direction in a basic area of an electric field generating electrode of the display device according to the invention.
Figure 10:
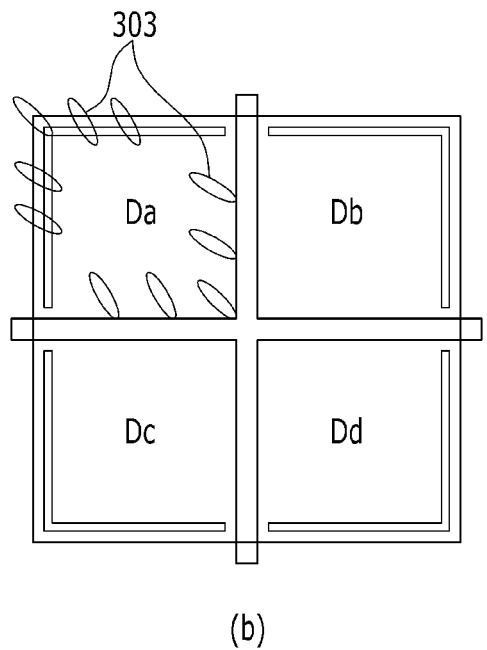

FIG. 9 is a view illustrating a process of making the liquid crystal molecules have the pre-tilt by using a prepolymer polymerized by light such as ultraviolet rays, and FIG. 10 conceptually illustrates a liquid crystal direction in the basic area of the electric field generating electrode of the display device according to an exemplary embodiment of the invention.

First, a prepolymer 330 such as a monomer hardened by a polymerization through light such as ultraviolet rays is injected between the two panels 100 and 200 (refers to FIG. 5) together with a liquid crystal material. In an exemplary embodiment, the prepolymer 330 may be reactive mesogen which has the polymerization by the light such as ultraviolet rays.

Subsequently, an electric field is generated in the liquid crystal layer 3 between the two electric field generating electrodes by applying the data voltage to the pixel electrode 191 and applying the common voltage to the common electrode 270. Then, the liquid crystal molecules 310 of the liquid crystal layer 3 incline in a direction approximately parallel to a direction from four vertexes of the pixel electrode 191 to a center of the cutout 271 of the common electrode 270 having the cross shape by a fringe field by the cutout 271 of the common electrode 270 and the cutout 91 of the pixel electrode 191 in response to the electric field, and directions in which the liquid crystal molecules 310 incline in one basic area are a total of four directions. That is, the liquid crystal molecules 310 located at four sub areas included in the one basic area are disposed to have different pre-tilts.

The above description will be made in detail with reference to FIG. 10. Referring to FIG. 10A, directors 301a and 301b included in a first director 301 of the liquid crystal molecules in parts close to the edges of the pixel electrode 191 included in the basic area of the electric field generating electrode are perpendicular to the edges of the pixel electrode 191, respectively. Further, the directors 302a and 302b included in a first director 302 of the liquid crystal molecules in the parts close to the cutout 271 of the common electrode included in the basic area of the electric field generating electrode are perpendicular to the edges of the cutout 271 of the common electrode 270. As described above, the liquid crystal directors according to the fringe field generated by the edges of the pixel electrode 191 included in the basic area of the field generating electrode and the cutout 91 of the pixel electrode 191 and the cutout 271 of the common electrode are primarily determined and the liquid crystal directors are secondarily disposed in a direction allowing the liquid crystal molecules to meet and transformation to be minimized. The secondary arrangement direction becomes a vector sum direction of directions in which the respective directors face. Accordingly, as illustrated in FIG. 10B, the liquid crystal directors 303 finally nearly become parallel to the direction from four parts where edges of the pixel electrode 191 extending in different directions meet to a center of the cutout 271 of the common electrode 270 having the cross shape. In the sub areas Da, Db, Dc, and Dd, directors of the liquid crystal molecules 310 are similarly disposed according to the fringe field, and directions in which the liquid crystal molecules within each basic area of the electric field generating electrode incline are a total of four directions. Specifically, the directors of the liquid crystal molecules 310 are obliquely disposed in a lower right direction from the pixel edges to the center of the cutout 271 in the first area Da of the sub areas, the directors of the liquid crystal molecules 310 are obliquely disposed in a lower left direction from the pixel edges to the center of the cutout 271 in the second area Db, the directors of the liquid crystal molecules 310 are obliquely disposed in an upper right direction from the pixel edges to the center of the cutout 271 in the third area Dc, and the directors of the liquid crystal molecules 310 are obliquely disposed in an upper left direction from the pixel edges to the center of the cutout 271 in the fourth area Dd.

Since the fringe field is not generated in the area where the cutout 91 is defined, a size of the fringe field applied to the edge of the pixel electrode 191 can be controlled. Accordingly, an incline of the liquid crystal molecules 310 disposed close to the edges of the pixel electrode 191 in a direction perpendicular to the edge of the pixel electrode 191 is controlled by reducing an influence of the fringe field applied to the liquid crystal molecules 310 disposed close to the edges of the pixel electrode 191, thereby effectively preventing deterioration of the display quality which can be generated according to the incline of the liquid crystal molecules in the direction perpendicular to the edges of the pixel electrode 191.

Although it has been described that the prepolymer 330 is located between the liquid crystal molecules 310, the invention is not limited thereto. The prepolymer 330 may be included in the first and second alignment layers 11 and 21 as well as the liquid crystal layer 3. That is, when the first alignment layer 11 and the second alignment layer 21 are provided, the prepolymer 330 may be disposed on each of the first substrate 110 and the second substrate 210 together with an alignment material. In an exemplary embodiment, the prepolymer 330 may be reactive mesogen which has the polymerization by the light such as ultraviolet rays. In this case, the first and second alignment layers 11 and 21 located at four sub areas included in one basic area have different pre-tilts.

Next, the LCD according to an exemplary embodiment of the invention will be described below with reference to FIGS. 11 and 12.

Figure 11:
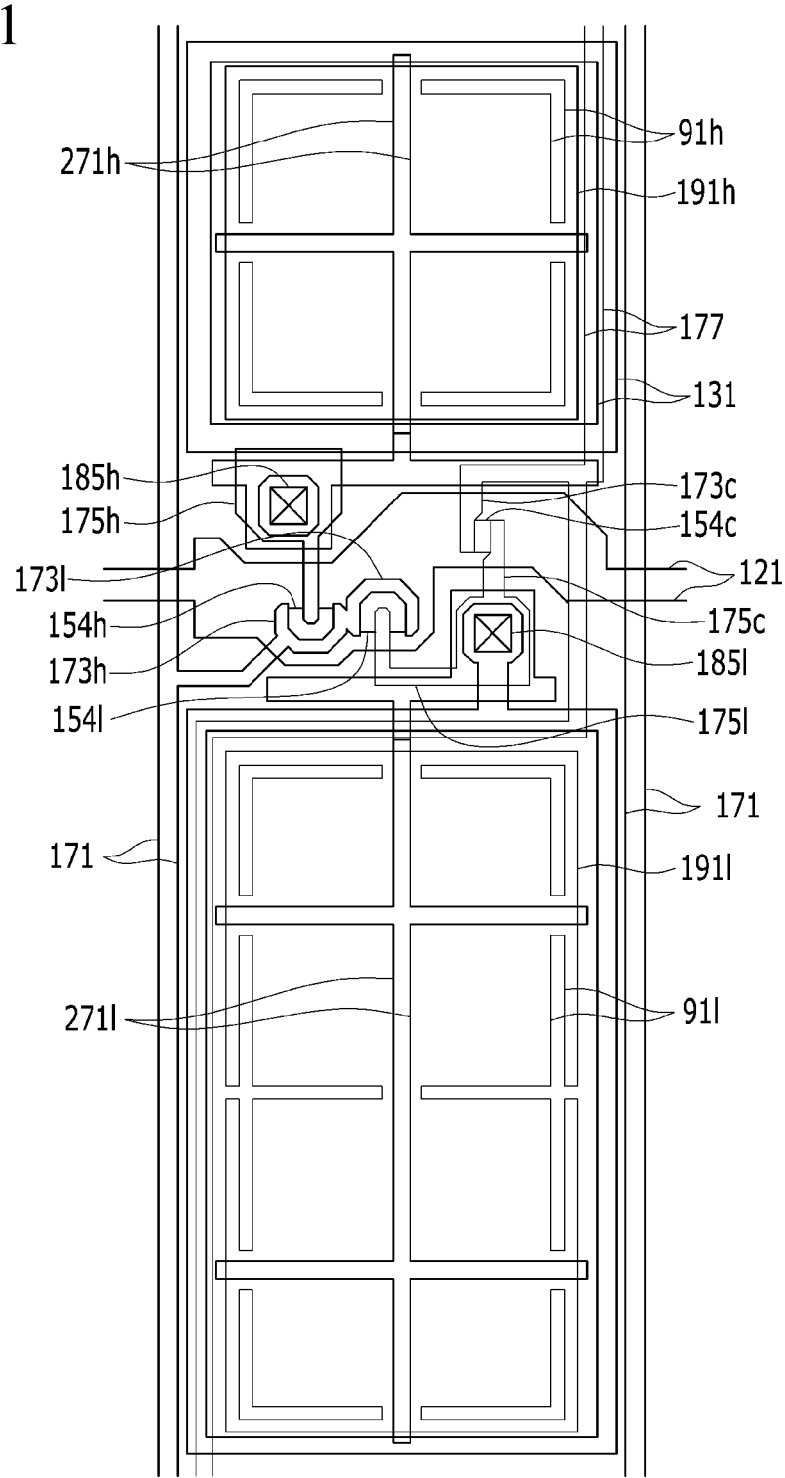
FIG. 11 is a top plan view of an exemplary embodiment of one pixel of a LCD according to the invention.
Figure 12:
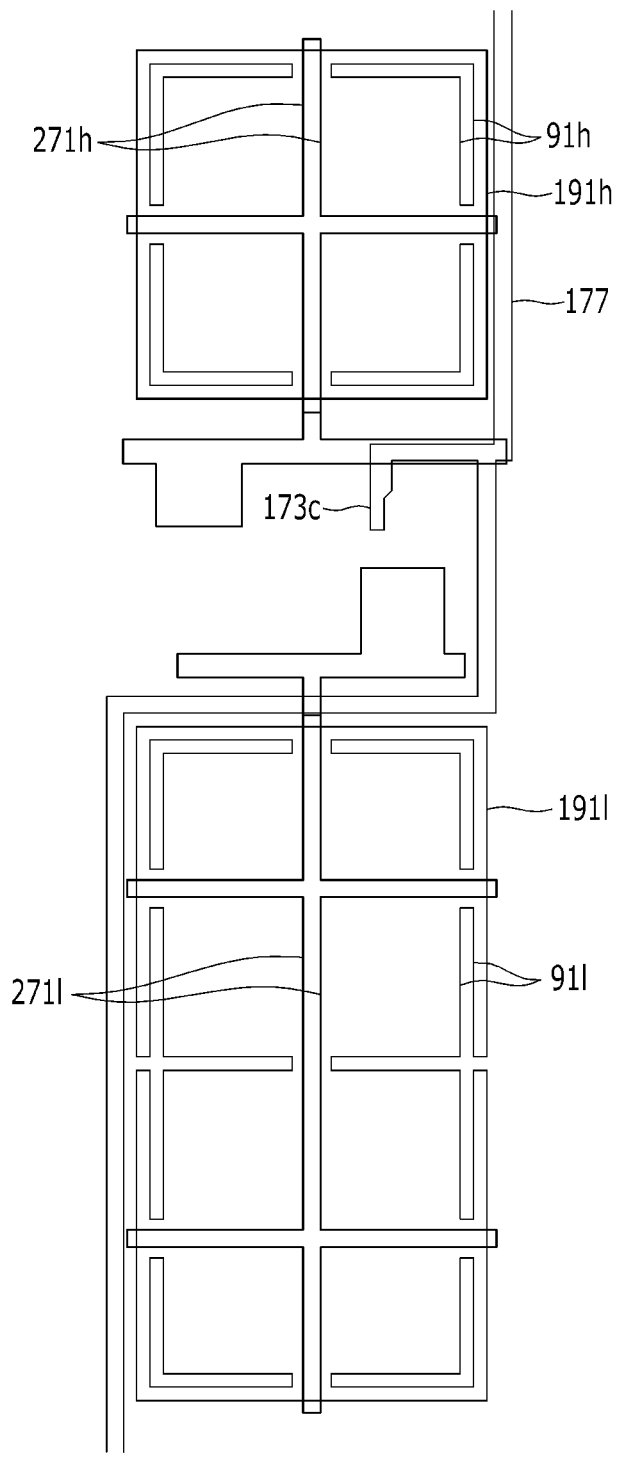
FIG. 12 is a top plan view illustrating an exemplary embodiment of some components of one pixel of a LCD according to the invention.

Since the LCD according to the exemplary embodiment of the invention illustrated in FIGS. 11 and 12 has substantially the same parts as those of the LCD according to the exemplary embodiment of the invention illustrated in FIGS. 1 to 6, descriptions thereof will be omitted. Since the exemplary embodiment has a difference in a position where the storage electrode line is provided from the above described exemplary embodiment, a detailed description thereof will be made below.

FIG. 11 is a top plan view of one pixel of the LCD according to the exemplary embodiment of the invention, and FIG. 12 is a top plan view illustrating some components of one pixel of the LCD according to the exemplary embodiment of the invention. FIG. 12 illustrates the pixel electrode, the upper storage electrode line, and the cutout of the common electrode.

In the previous exemplary embodiment, the upper storage electrode line 177 is disposed at right edges of the first subpixel electrode 191h and the second subpixel electrode 191l, and between the first subpixel electrode 191h and the second subpixel electrode 191l. In another exemplary embodiment, in the exemplary embodiment, the upper storage electrode line 177 is disposed at the right edge of the first subpixel electrode 191h, a left edge of the second subpixel electrode 191l, and between the first subpixel electrode 191h and the second subpixel electrode 191l.

The third source electrode 173c protrudes from the upper storage electrode line 177, and more specifically, protrudes from a right bottom of the first subpixel electrode 191h. In a pixel illustrated in FIG. 11, the third switching element is located at a right side between the first subpixel electrode 191h and the second subpixel electrode 191l. Accordingly, the third source electrode 173c is also located at the right side between the first subpixel electrode 191h and the second subpixel electrode 191l. At this time, the first source electrode 173h and the second source electrode 173l may be connected to the data line located at a left side of the pixel electrode 191.

Although not illustrated, in the pixel located at the bottom of the illustrated pixel, the upper storage electrode line 177 may be disposed at a left edge of the first subpixel electrode 191h, the right edge of the second subpixel electrode 191l, and between the first subpixel electrode 191h and the second subpixel electrode 191l. The third switching element may be located at the left side between the first subpixel electrode 191h and the second subpixel electrode 191l. Accordingly, the third source electrode 173c may also be located at the left side between the first subpixel electrode 191h and the second subpixel electrode 191l. The first source electrode 173h and the second source electrode 173l may be connected to the data line 171 located at a right side of the pixel electrode 191. In such a structure, by applying voltages having different polarities to two adjacent data lines 171, polarities of voltages applied to two pixels which are vertically adjacent to each other may be different.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
a first substrate and a second substrate facing each other;
a pixel electrode disposed on the first substrate;
a storage electrode line which is close to edges of the pixel electrode, nonoverlapping and spaced apart from all of the pixel electrode in a plan view;
a common electrode disposed on the second substrate; and
a liquid crystal layer disposed between the first substrate and the second substrate,
wherein
a first cutout having a cross shape in the plan view is defined in the common electrode,
a second cutout which is close to an edge among the edges of the pixel electrode and disposed along the edge in the plan view, is defined in the pixel electrode,
the storage electrode line includes an upper storage electrode line and a lower storage electrode line, and
the upper storage electrode line and the lower storage electrode line overlap each other along an edge of the pixel electrode and spaced apart from the entire pixel electrode, for reduction of a vertical cross talk between the pixel electrode and a data line.

2. The liquid crystal display of claim 1, further comprising:
a gate line disposed on the first substrate in a first direction; and
a data line disposed on the first substrate in a second direction,
wherein the gate line and the data line are disposed on different layers.

3. The liquid crystal display of claim 2, wherein:
the storage electrode line and the data line are disposed in a same layer.

4. The liquid crystal display of claim 3, further comprising:
a first gate electrode, a second gate electrode, and a third gate electrode which protrude from the gate line;
a first semiconductor layer, a second semiconductor layer, and a third semiconductor layer disposed on the first gate electrode, the second gate electrode, and the third gate electrode, respectively;
a first source electrode and a second source electrode which protrude from the data line and are disposed on the first semiconductor layer and the second semiconductor layer, respectively;
a first drain electrode provided to be spaced apart from the first source electrode and on the first semiconductor layer;
a second drain electrode provided to be spaced apart from the second source electrode and on the second semiconductor layer;
a third source electrode which protrude from the storage electrode line and is disposed on the third semiconductor layer; and
a third drain electrode connected to the second drain electrode, and provided to be spaced apart from the third source electrode and on the third semiconductor layer.

5. The liquid crystal display of claim 4, wherein:
the storage electrode line and the third source electrode are disposed in a same layer.

6. The liquid crystal display of claim 5, wherein:
the upper storage electrode line and the data line are disposed in the same layer in parallel to each other.

7. The liquid crystal display of claim 6, wherein:
the lower storage electrode line and the gate line are disposed in a same layer in parallel to each other.

8. The liquid crystal display of claim 1, wherein:
the third semiconductor layer is further disposed under the upper storage electrode line, and
the lower storage electrode line is disposed under the third semiconductor layer.

9. The liquid crystal display of claim 4, wherein:
the pixel electrode includes a first subpixel electrode and a second subpixel electrode,
the first subpixel electrode is connected to the first drain electrode, and
the second subpixel electrode is connected to the second drain electrode.

10. The liquid crystal display of claim 9, wherein:
the storage electrode line is close to right edges of the first subpixel electrode and the second subpixel electrode.

11. The liquid crystal display of claim 9, wherein:
the storage electrode line is close to a right edge of the first subpixel electrode and a left edge of the second subpixel electrode.

12. The liquid crystal display of claim 9, wherein:
the storage electrode line is close to a left edge of the first subpixel electrode and a right edge of the second subpixel electrode.

13. The liquid crystal display of claim 3, further comprising:
a first switching element and a second switching element each connected to the gate line and the data line; and
a third switching element connected to the gate line, the storage electrode line, and the second switching element,
wherein
the pixel electrode includes a first subpixel electrode and a second subpixel electrode,
the first subpixel electrode is connected to the first switching element, and
the second subpixel electrode is connected to the second switching element.

14. The liquid crystal display of claim 13, wherein:
the storage electrode line is close to right edges of the first subpixel electrode and the second subpixel electrode.

15. The liquid crystal display of claim 13, wherein:
the storage electrode line is close to a right edge of the first subpixel electrode and a left edge of the second subpixel electrode.

16. The liquid crystal display of claim 13, wherein:
the storage electrode line is close to a left edge of the first subpixel electrode and a right edge of the second subpixel electrode.

17. The liquid crystal display of claim 13, wherein:
the upper storage electrode line and the data line are disposed in the same layer in parallel to each other.

18. The liquid crystal display of claim 17, wherein:
the lower storage electrode line and the gate line are disposed in a same layer in parallel to each other.